(12) United States Patent
Beda et al.

(10) Patent No.: US 9,734,729 B2
(45) Date of Patent: Aug. 15, 2017

(54) METHODS AND SYSTEMS FOR PROVIDING TAXIWAY STOP BAR INFORMATION TO AN AIRCREW

(71) Applicant: HONEYWELL INTERNATIONAL INC., Morristown, NJ (US)

(72) Inventors: Tomas Beda, Prague (CZ); Ondrej Koukol, Prague (CZ); Ondrej Pokorny, Merin (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 178 days.

(21) Appl. No.: 13/860,699

(22) Filed: Apr. 11, 2013

(65) Prior Publication Data

US 2014/0309915 A1 Oct. 16, 2014

(51) Int. Cl.
| | | |
|---|---|---|
| G08G 5/06 | (2006.01) |
| G08G 5/00 | (2006.01) |
| G06K 9/00 | (2006.01) |
| G06T 7/73 | (2017.01) |
| G01C 23/00 | (2006.01) |

(52) U.S. Cl.
CPC .......... *G08G 5/065* (2013.01); *G06K 9/00791* (2013.01); *G06T 7/73* (2017.01); *G08G 5/0021* (2013.01); *G01C 23/00* (2013.01); *G06T 2207/10048* (2013.01); *G06T 2207/30256* (2013.01); *G08G 5/0026* (2013.01)

(58) Field of Classification Search
None
See application file for complete search history.

(56) References Cited

U.S. PATENT DOCUMENTS

| 5,485,151 | A | 1/1996 | Runyon et al. |
| 6,246,342 | B1 | 6/2001 | Vandevoorde et al. |
| 6,411,890 | B1 | 6/2002 | Zimmerman |
| 6,606,563 | B2 | 8/2003 | Corcoran, III |
| 7,196,329 | B1 | 3/2007 | Wood |
| 7,382,288 | B1 | 6/2008 | Wilson et al. |
| 7,414,545 | B2 * | 8/2008 | Vickas .......................... 340/953 |
| 7,567,187 | B2 * | 7/2009 | Ramaiah et al. ............. 340/945 |
| 7,589,644 | B2 | 9/2009 | Meunier |
| 7,860,641 | B2 | 12/2010 | Meunier |

(Continued)

FOREIGN PATENT DOCUMENTS

| EP | 0148284 A1 | 7/1985 |
| EP | 2378460 A1 | 10/2011 |

(Continued)

OTHER PUBLICATIONS

Devy, M. et al.; Development of Algorithms and Architectures for Driving Assistance in Adverse Weather Conditions using FPGAs; tel-00771869, version 1, Jan. 9, 2013, Universite de Toulouse.

(Continued)

*Primary Examiner* — Rami Khatib
(74) *Attorney, Agent, or Firm* — Lorenz & Kopf, LLP

(57) ABSTRACT

A method for displaying stop bar information to an aircrew member of an aircraft includes the steps of capturing a light signature emitted from an area surrounding the aircraft, processing the captured light signature to detect a lighted stop bar, and providing information to the aircrew member regarding the detection of the lighted stop bar.

15 Claims, 7 Drawing Sheets

(56) References Cited

U.S. PATENT DOCUMENTS

| | | |
|---|---|---|
| 7,908,079 B1 | 3/2011 | Dabney et al. |
| 8,903,655 B2 * | 12/2014 | Feyereisen et al. .......... 701/516 |
| 2002/0185600 A1 | 12/2002 | Kerr |
| 2003/0160708 A1 | 8/2003 | Knoop |
| 2007/0078590 A1 * | 4/2007 | Meunier ....................... 701/120 |
| 2009/0021397 A1 | 1/2009 | Wipf et al. |
| 2009/0045982 A1 | 2/2009 | Caillaud |
| 2011/0037616 A1 * | 2/2011 | Leutelt et al. ................ 340/901 |
| 2011/0187580 A1 | 8/2011 | Laenen et al. |
| 2014/0129125 A1 * | 5/2014 | Ovens et al. ................. 701/300 |

FOREIGN PATENT DOCUMENTS

| | | |
|---|---|---|
| FR | 2922072 A1 | 4/2009 |
| JP | 4328099 A | 11/1992 |
| WO | 2013020070 A2 | 2/2013 |

OTHER PUBLICATIONS

Katz, E.S. et al.; Prototype Stop Bar System Evaluation at John F. Kennedy International Airport, Sep. 1992, AD-A258667; DOT/FAA/CT-92/24 FAA Technical Center Atlantic City International Airport N.J.

EP Search Report for Application No. EP 14162517.8 dated Feb. 9, 2015.

EP Examination Report for Application No. EP 14162517.8 dated Feb. 25, 2015.

* cited by examiner

METHODS AND SYSTEMS FOR PROVIDING TAXIWAY STOP BAR INFORMATION TO AN AIRCREW

TECHNICAL FIELD

The present invention generally relates to aviation, and more particularly relates to systems and methods for providing taxiway stop bar information to an aircrew.

BACKGROUND

Modern flight deck displays for aircraft provide a considerable amount of information, such as vehicle position, speed, altitude, attitude, navigation, target, and terrain information. Most modern displays additionally display a flight plan from different views, either a lateral view, a vertical view, or a perspective view, which can be displayed individually or simultaneously on the same display.

Current ground operations, including for example taxiing procedures, at complex airports and/or in the low visibility conditions include a strictly-defined system of aircraft movement. The taxiways are separated into individual segments wherein only one aircraft can be present in the segment at a time. This system ensures the reduction of collision risks between aircraft. These segments are bounded by two or more "stop bars" that are controlled manually or automatically by air traffic control services. Further, the entry into a runway can be also equipped by these stop bars to protect the runway against inadvertent entry by aircraft or other vehicles when the runway is occupied. The aircrew's responsibility is to stop and hold at all active stop bars ahead of the aircraft. The responsibility is based on regulatory document ICAO (International Civil Aviation Organization) ANNEX 2:

"3.2.2.7.3 An aircraft taxiing on the manoeuvring area shall stop and hold at all lighted stop bars and may proceed further when the lights are switched off."

Thus the aircrew follows the clearances from the air traffic control services that provide him or her guidance of crossing the stop bar.

However, a safety risk occurs when the aircrew is not able to detect the stop bar correctly in low visibility or when the aircrew overlooks the stop bar for various reasons. Further, in order to avoid missing stop bars, aircrew typically reduce the aircrafts taxiing speed below normal taxiing speeds to reduce the possibility of oversight of a lighted stop bar.

Stop bar detection solutions known in the prior art primarily include ground-based solutions such as induction loops, microwave sensors, or light gates, etc. These solutions are typically presented at complex airports with dense traffic and that have a good ground infrastructure. Other solutions known in the prior art include onboard solutions that are based on navigation databases with stored stop bar positions and/or datalinks from Air Traffic Control (ATC) that provides the current status of stop bars. The disadvantage of these onboard solutions is the requirement for periodical updating of the database and necessary datalinks and/or radio communication between aircrew and air traffic control services.

Accordingly, it is desirable to provide improved systems and methods for stop bar detection and for providing stop bar information to an aircrew. In addition, it is desirable to provide such systems and methods that are based onboard an aircraft and that do not require database updating and links to ATC services. Furthermore, other desirable features and characteristics of the present invention will become apparent from the subsequent detailed description of the invention and the appended claims, taken in conjunction with the accompanying drawings and this background of the invention.

BRIEF SUMMARY

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

In one exemplary embodiment, a system for displaying stop bar information to an aircrew member of an aircraft includes a display subsystem configured to display visual information to the aircrew member of the aircraft, a position detecting subsystem that is configured to detect a current location of the aircraft with respect to a ground surface and to generate a first signal indicative of the current location of the aircraft, a light detection subsystem that is configured to detect a light signature emitted from a stop bar, and a processor operatively coupled with the display subsystem, the position detecting subsystem, the light detection subsystem. The processor is configured to receive the first signal from the position detecting subsystem, to receive the second signal from the light detection subsystem, and to generate information regarding the position of a detected stop bar. The processor is further configured to command the display subsystem to display a graphic depiction of the detected stop bar on the display subsystem.

In another exemplary embodiment, a method for displaying stop bar information to an aircrew member of an aircraft includes the steps of capturing a light signature emitted from an area surrounding the aircraft, processing the captured light signature to detect a lighted stop bar, and providing information to the aircrew member regarding the detection of the lighted stop bar.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
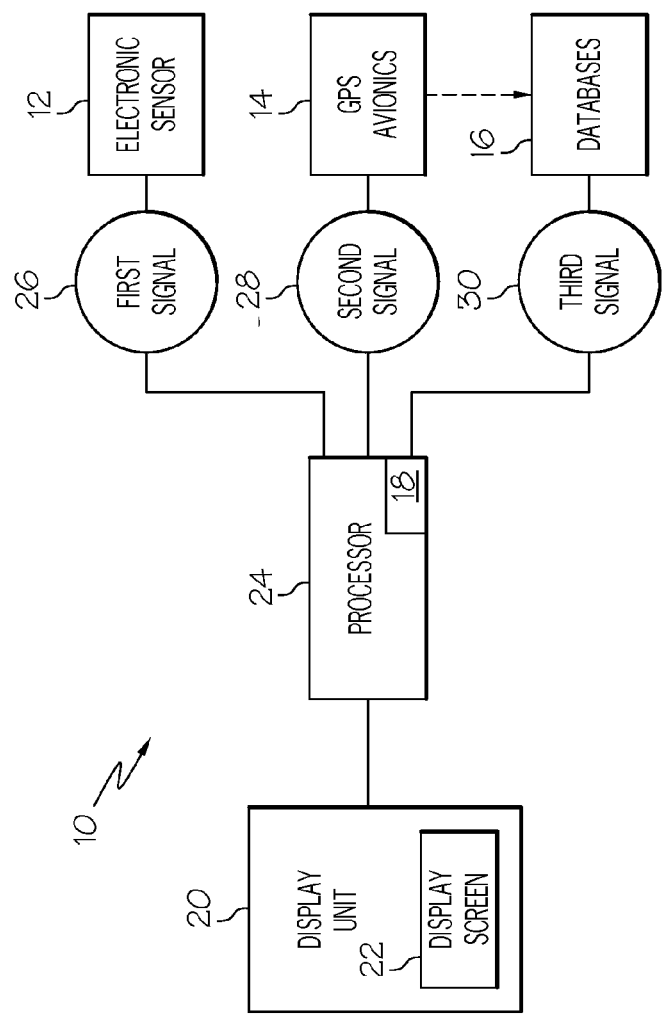
FIG. 1 is a functional block diagram of a stop bar information system in accordance with an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments and implementations of the systems and methods described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration including but not limited to a general purpose graphics processing unit (GPGPU).

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium.

FIG. 1 is a simplified functional block diagram illustrating a system 10 for displaying images to a pilot of an aircraft during operation of the aircraft, including for example during taxiing procedures on the grounds of an airport. System 10 includes multiple components each of which may be configured for mounting to aircraft. In some embodiments, system 10 may be a self-contained system such that each of the components described below are contained in a single housing and are dedicated exclusively to serving the functions of system 10, while in other embodiments, the various components described below may be standalone components or they maybe components that are used as part of other systems and which are configured to be used as a shared resource between such other systems and system 10.

In the embodiment illustrated in FIG. 1, system 10 includes an enhanced vision system 12 (EVS), a Global Positioning System and avionics sensors 14, a synthetic vision system 16 (SVS), a display unit 20, a display screen 22, and a processor 24. In alternative embodiments, system 10 may include either additional or fewer components.

EVS 12 includes one or more sensors adapted for mounting to an aircraft and configured to detect a light signature originating from outside the aircraft, including for example the light signature emitted from a stop bar located on the ground on the surface area of an airport. The sensor may include a visible low light television camera, an infrared (IR) camera, and millimeter wave (MMW) camera or any other light sensing device capable of detecting light either within, or outside of the visible spectrum. In a preferred embodiment, the sensor is an infrared camera capable of detecting an infrared light signature. The light signature may include any light that is projected from, or that is reflected off of any terrain or object outside of the aircraft, including for example a stop bar as noted above. In one application, the light signature includes, but is not limited to, signature components from lights that are positioned adjacent to a taxiway and which are pointed to facilitate taxing operations in the surface area of an airport, such as stop bars.

EVS 12 is configured to generate a first signal 26 and to provide first signal 26 to processor 24. First signal 26 is an electronic signal that includes information corresponding to the light signature detected by EVS 12. For example, if the detected light signature includes components of a stop bar adjacent to the taxiway, first signal 26 would enable processor 24 to render an indication of the stop bar, which may be a visual indication, audio indication, or any other form of indication capable of being received by an aircrew. In some embodiments, EVS 12 may include a dedicated processor, a microprocessor, circuitry, or some other processing component that is configured to receive input from the one or more light detecting sensors and to generate first signal 26 using such inputs. In other embodiments, EVS 12 may not include a dedicated processor, microprocessor, circuitry or other processing component, in which case the first signal 26 would comprise unprocessed inputs from the light detecting sensors of EVS 12 for processing by processor(s) 24.

SVS 16 is an optional component of the system 10 that may or may not be included in a given embodiment. Wherein included, SVS 16 is configured to generate a two- or three-dimensional image of the topographical environment around the aircraft and generate a third signal 30 carrying SVS Image and to provide the third signal 30 to processor 24. In some embodiments, SVS 16 may include a data storage device (not shown) containing a data base with data relating to the topography, which may represent either or both landscape and/or man-made structures located along the aircraft's path. For example, in the context of an airport taxiway, the data base may include taxiways, runways, holding areas, and other features as may be found in the ground area of an airport. In some embodiments, the data storage device may contain such data for an entire geographical region such as a state, a country or continent. SVS 16 may also access or include a position determining unit that is configured to determine the position of the aircraft with respect to the surface of the earth. Such a position determining unit may include, but is not limited to, a GPS system, an inertial navigation system, and the like. SVS 16 may be configured to receive direction, ground speed, and other avionics inputs relating to the aircraft's movement along the ground. In alternative embodiments, SVS 16 may receive the GPS and avionics inputs from the aircraft's GPS and avionics sensors 14.

In some embodiments, SVS 16 may include a dedicated processor, microprocessor, or other circuitry that is configured to take the information pertaining to the position and heading of the aircraft and to utilize the information available in the database to generate a third signal 30 that may be utilized by processor 24 to render a two- or three-dimensional image of the topographical environment through which the aircraft is traveling. In other embodiments, SVS 16 may not include a dedicated processor, microprocessor or other circuitry. In such embodiments, third signal 30 would contain the unprocessed sensor information and location data which could then be utilized by processor 24 to render the three dimensional image of the topographical environment. In either event, SVS 16 is configured to provide third signal 30 to processor 24.

Display unit 20 may be any type of display device that generates visual output using any one of a number of different technologies. For example, display unit 20 may be a Cathode Ray Tube (CRT) display device, a flat panel display device, a Liquid Crystal Display (LCD) device, a plasma display device, an electro-luminescent display device, a Light Emitting Diode (LED) display device, a holographic display device, a Head Up Display (HUD), a Micro Mirror Device (MMD) display device, a near-to-eye display or the like.

Additionally, display unit 20 includes a display screen 22 that is operatively connected to display unit 20. Display screen 22 is configured to be controlled by display unit 20 and may be used to display any type of image including, but not limited to, graphics and text. In some embodiments, display unit 20 may include multiple display screens 22 and system 10 may include multiple display units 20. Additionally, other units may be included that are able to provide information to the aircrew, including audio generating units (such as speakers), light generating units (such as flashing indicators), and the like. The manner by which information is provided to the aircrew, particularly stop bar information in accordance with the present disclosure, should not be understood as limited to any particular type of display or any particular type of information providing (or indication) device.

Processor 24 may be any type of computer, computer system, microprocessor, collection of logic devices, or any other analog or digital circuitry that is configured to calculate, and/or to perform algorithms, and/or to execute software applications, and/or to execute sub-routines, and/or to be loaded with and to execute any type of computer program. Processor 24 may comprise a single processor or a plurality of processors acting in concert. In some embodiments, processor 24 may be dedicated for use exclusively with system 10 while in other embodiments processor 24 may be shared with other systems on board the aircraft. In still other embodiments, processor 24 may be integrated into any of the other components of system 10. For example, in some embodiments, processor 24 may be a component of SVS 16 or of EVS 12.

Processor 24 is communicatively coupled to EVS 12, GPS/avionics sensors 14, and SVS 16, and is operatively coupled to display unit 20. Such communicative and operative connections may be effected through the use of any suitable means of transmission, including both wired and wireless connections. For example, each component may be physically connected to processor 24 via a coaxial cable or via any other type of wired connection effective to convey electronic signals. In other embodiments, each component may be communicatively connected to processor 24 across a bus or other similar communication corridor. Examples of suitable wireless connections include, but are not limited to, a Bluetooth connection, a Wi-Fi connection, an infrared connection or the like.

Being communicatively and/or operatively coupled with EVS 12, GPS/avionics sensors 14, SVS 16, and display unit 20, provides processor 24 with a pathway for the receipt and transmission of signals, commands, instructions, and interrogations to and from each of the other components. Processor 24 is configured (i.e., loaded with and being capable of executing suitable computer code, software and/or applications) to interact with and to coordinate with each of the other components of system 10 for the purpose of providing stop bar information to the aircrew operating the aircraft on which system 10 is provided. For example, in one non-limiting embodiment, processor 24 is configured to receive third signal 30 from EVS 12 and to send a command to display unit 20 instructing display unit 20 to display a corresponding image on a display screen 22 indicative of the presence of the stop bar. The image may merely be an image of the stop bar, or the image may be an enhanced image including one or more visual cues to draw the aircrew's attention to the stop bar. Other audio/visual information/indicators may be provided accompanying the image. Processor 24 may also be configured to receive a second signal 28 from the aircraft's GPS/Avionics system 14, to further aide in the detection of lighted stop bars. In some embodiments, an image from SVS 16 may accompany the image from EVS 12 on the display screen 22 (for example, one may be overlaid on the other).

With particular reference now to an embodiment wherein EVS 12 is provided as an infrared (IR) camera, it has been found that IR cameras are suitable for capturing real-time scenery ahead of aircraft not only in low visibility conditions but also in normal weather conditions. The IR camera may be accompanied with an image processing unit that is capable of detecting the signature of a stop bar on the ground of an airport and preparing output image for display unit 20. One example of an image processing unit that could be used with embodiments of the present disclosure is the SmartView® system developed by Honeywell International Inc. of Morristown, N.J. Further, in connection with the image processing unit and the IR camera, as noted above, a database may be provided that stores data regarding all stop bars at various airports. The data includes stop bar position and labels if it is available. The label is in the same format as the identification on the airport surface. The database improves the performance of the detection algorithms employed by the image processing unit.

In operation, based on the captured image from IR sensor the system confirms the estimated position of stop bar through computer vision detection, utilizing the image processing unit. An image detection algorithm focuses on searching for the horizontal line formed by stop bar lighting system, when activated. In a first step, the algorithm looks for the brightest spots in the received image and separates them from background. This is achieved by adaptive thresholding and morphological opening functions to remove noise and unimportant parts of image such a taxiway texture.

In the next step, the algorithm uses database information (if provided) for an estimation of stop bar location in image. The map database is electronically associated with the IR image based on GPS location, heading, and IR sensor properties such as IR sensor orientation, sensor mounting, resolution, view field, and zoom of camera. Further, information regarding the position and orientation of stop bar is associated with the data, which marks estimation position of lights in IR image. In case the database does not possess information about exact stop bar location, the algorithm can still search for stop bar at locations given by ICAO standards, for example before intersections between taxiways and runways with proper distance from runway edge and proper slope to the taxiway edge.

In a final step, the algorithm searches for lines formed by lights with similar properties as expected according to the database information. Factors that the algorithm takes into account can include, but are not limited to: location in the IR image, slope of the line of lights, and length of the line of light. The algorithm can further take other features into account as well. If similar lines with such features are detected, an average line that represents all of them can be computed. Special considerations are given to extended stop bar lights, which are in detected in the IR Image slightly above ground, and corrections to the line can be performed on that basis. In the case that the stop bar pavement lights are missing, the algorithm makes horizontal correction according to the ICAO standard regarding enhanced lights placement and properties. The output from this step is the detected location of stop bar in the IR image.

Figure 2A:
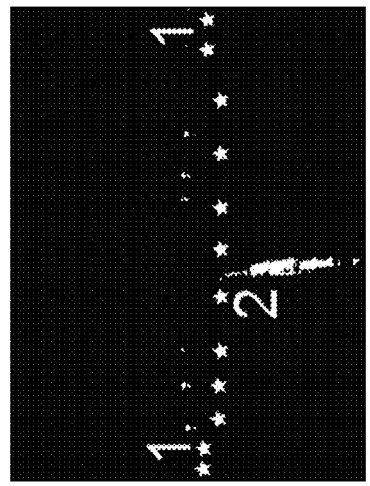
FIGS. 2*a*-2*d* are images of detected light emitted from stop bars on a taxiway of an airport.
Figure 2B:
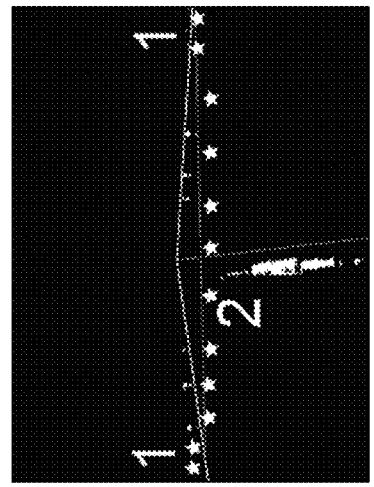
Figure 2C:
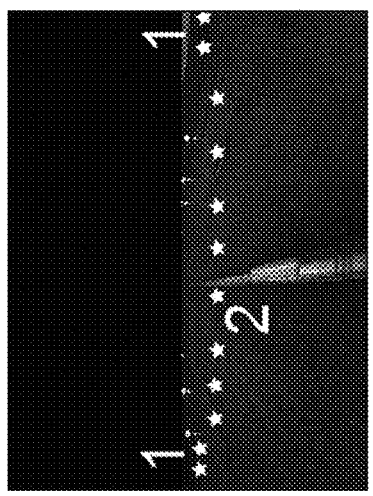
Figure 2D:
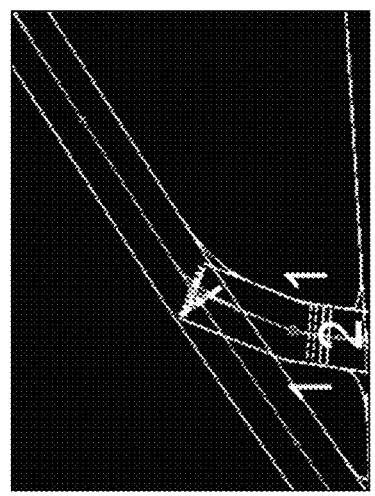
Figure 3:
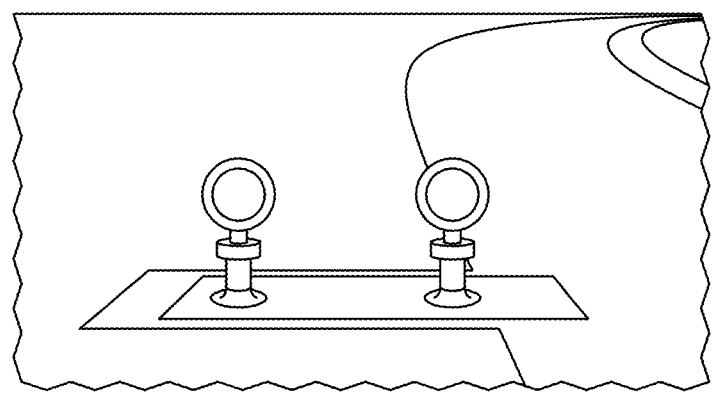
FIGS. 3 and 4 are exemplary images of various stop bar configurations.
Figure 4:
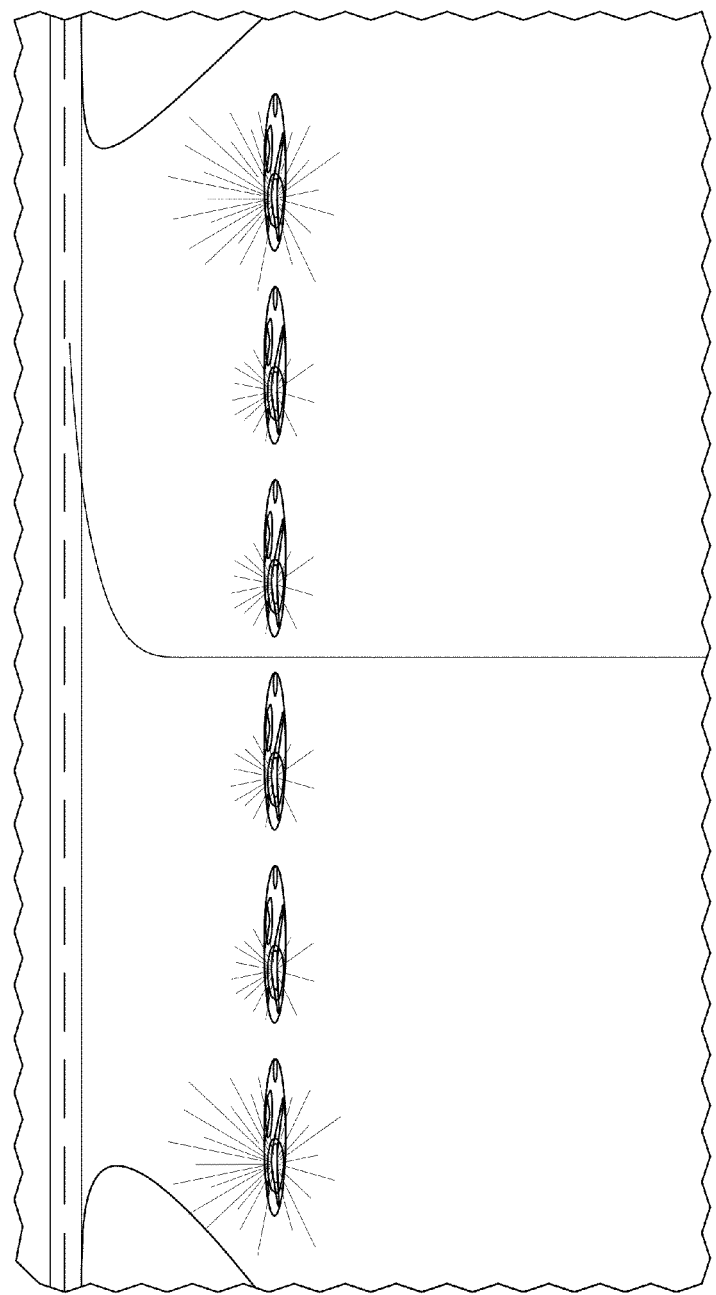

FIGS. 2a through 2d serve to illustrate an implementation of the described algorithm. FIG. 2a shows an image obtained from an IR sensor with various lights clearly visible. For clarity, the stop bar lights marked as a "star" symbol. Number [1] depicts extended stop bar lights as shown in FIG. 3 and number [2] depicts pavement stop bar lights as shown in FIG. 4. Other lights belong to the taxiway lightning system. FIG. 2b depicts the enhanced IR image with noise and non-critical features removed. FIG. 2c depicts database information about taxiways and runways. Further, FIG. 2d depicts database information super-imposed over enhanced IR image. In this manner, the system is able to generate and receive information regarding detected active stop bars, such information including position and optionally label information obtained from the database.

Figure 6:
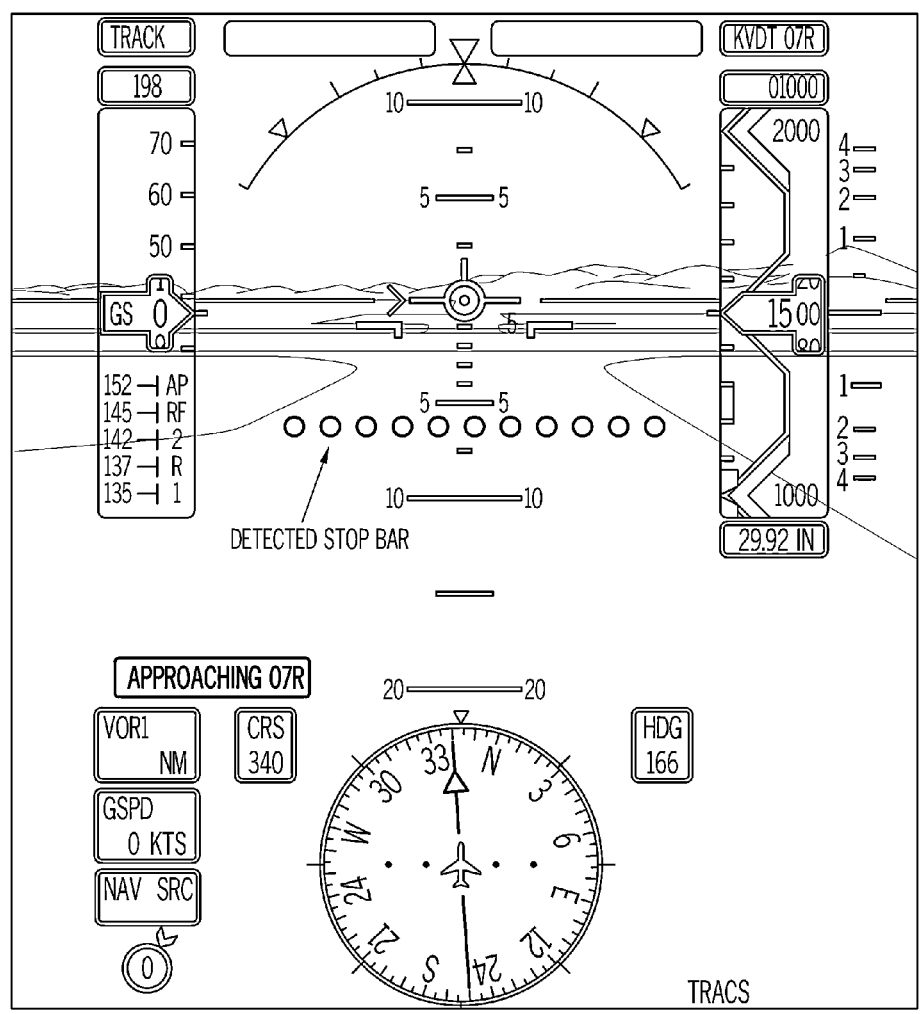
FIGS. 6 and 7 are exemplary graphical displays showing detected stop bars in accordance with various embodiments of the present disclosure.
Figure 7:
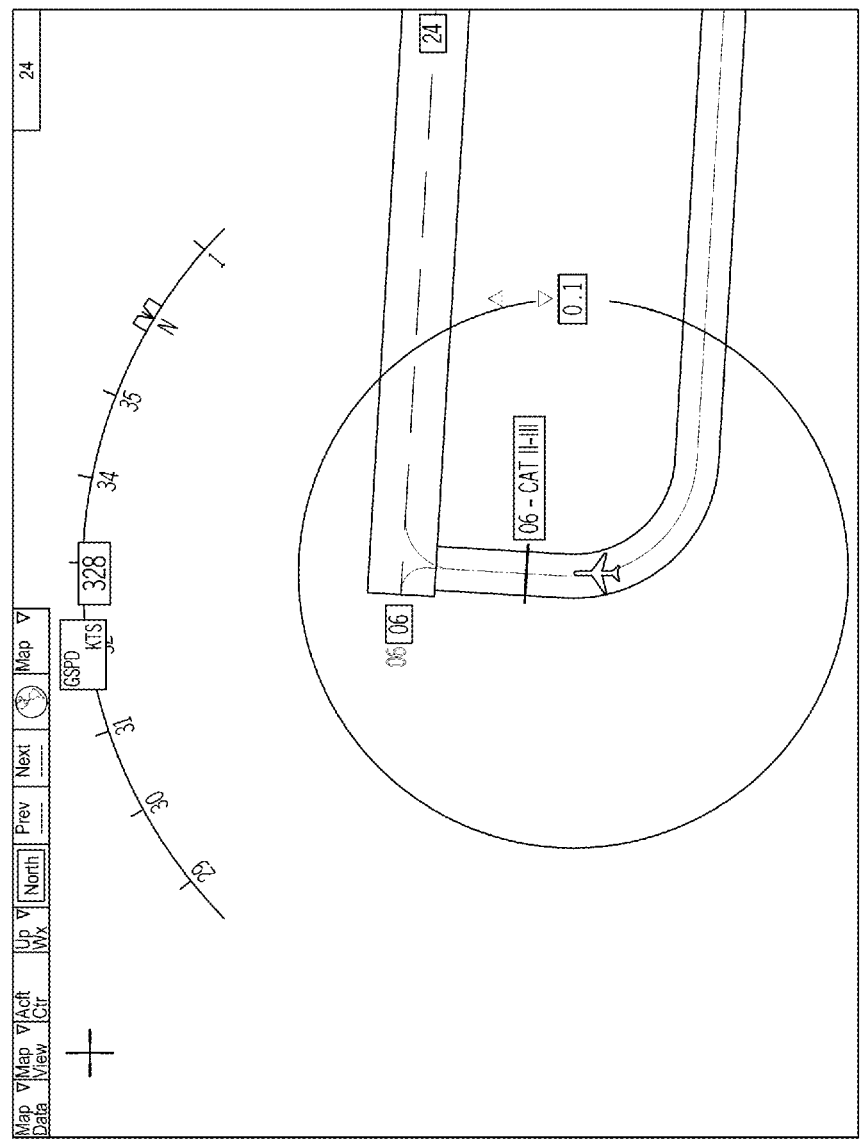

Once the system generates and processes information regarding the position of a detected stop bar, the information may be displayed to the aircrew in a variety of manners, as shown in FIGS. 6 and 7. In one example, the information may be provided on the primary flight display associated with the aforementioned SmartView® system or other synthetic depiction image (SVS 16, for example, as shown at FIG. 6), 3D airport moving map and/or airport moving map on Enhanced Navigation display (ENAV, for example, as shown at FIG. 7), or any other system that is able to depict active stop bar with respect to position of the aircraft. In some examples, the depiction can also include label of stop bar with regard to the scale of displayed image on the appropriate flight display.

In an extension of the presently described embodiment, the system may further be configured to determine a motional vector of the aircraft based on current braking abilities and/or a defined fix time interval prediction. This aircraft motional vector presents area inside which the aircraft is not able to stop. In situations where the motional vector crosses the position of detected stop bars, the system generates an appropriate caution alert (audio, visual, etc.) announcing this fact. The caution can be announced by visual and/or aural means and can be designed with respect to regulations regarding cockpit design.

In other examples, the caution alert can be changed to a warning alert when an aircraft position passes over the position of detected light (i.e., when the aircraft violates a taxiway segment restricted for other traffic). The warning can be also announced by visual and/or aural means and can be designed with respect to regulations regarding cockpit design.

Figure 5:
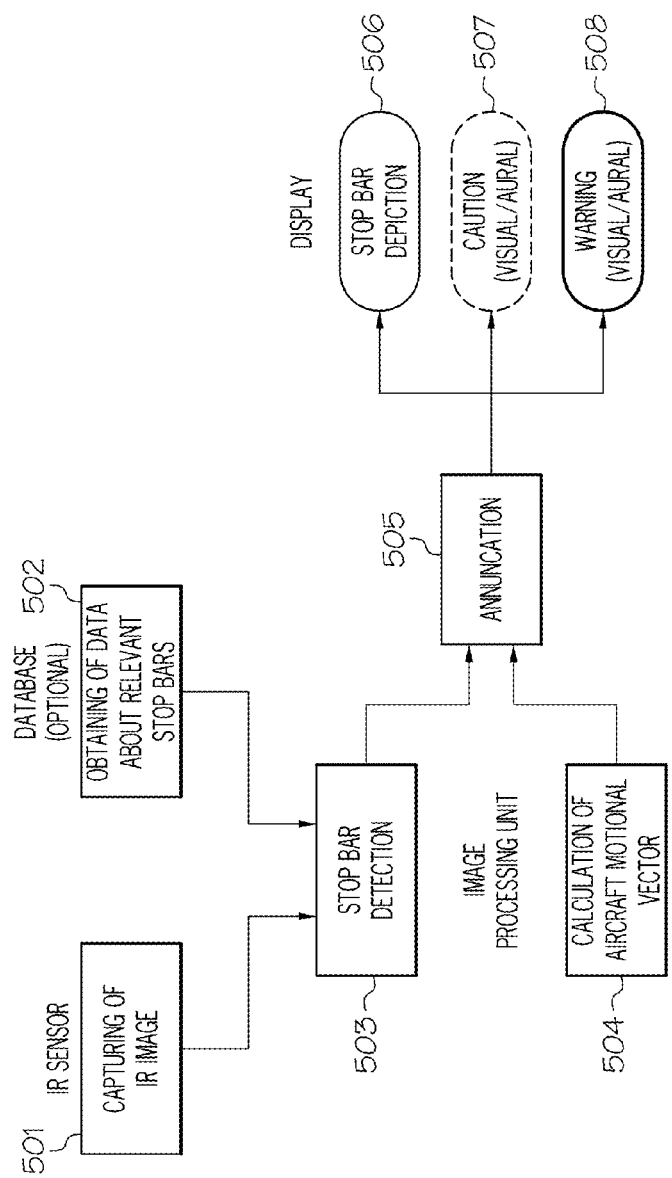
FIG. 5 is a block diagram illustrating an exemplary algorithm for processing detected light in accordance with an embodiment of the present disclosure.

FIG. 5 illustrates an exemplary process diagram in accordance with the above-described algorithm. At step 501, the system captures an IR image from an area surrounding the aircraft. At step 502, the system (optionally) obtains data from a database or other source regarding the position and configuration of stop bars at an airport. The information received in steps 501 and 502 is processed at step 503, using the algorithm, to detect a lighted (active) stop bar. Simultaneously (or at another time) the system may further be configured to calculate the motional vector of the aircraft at step 504. At step 505, the stop bar detection information (and optionally the aircraft motional vector) is processed to provide information to the crew at steps 505 and 506 regarding the detection of the stop bar. This information, as noted above, can be provided visually through display screen 22, through an audible annunciation, or by another suitable means. Depending on the motional vector of the aircraft, a caution alert may be issued at step 507 and/or a warning alert may be issued at step 508.

As such, it will be appreciated that the stop bar detection systems and methods disclosed herein provide a variety of benefits over systems previously known in the art. For example, the system is essentially a substitution of the pilot's eyesight by the system recognizing visual cues (stop bars) determining holding points during taxiing and gives better performance than pilot's eyesight in low visibility condition. The solution does not need any additional equipment on the airport surface, nor does it require additional equipment on the aircraft, as many aircraft are already equipped with infrared cameras used for other purposes. Further, based on information from the IR sensor and detection algorithms, the status of the stop bars ahead can be determined by the system. The database with stored stop bar positions can provide an expected position of an appropriate line for detection algorithms to thereby improve the algorithms performance. Additionally, the system is able to generate additional caution provided when the pilot controls the aircraft in the way which would result into violation of the active taxiway segment. This caution is generated based on distance to active stop bars, current ground speed, and current braking capability. The system is able to generate additional warning announced when the aircraft overruns the active stop bars thereby contravenes a command provided by ATC. Still further, the presently described system provides an additional benefit in that the active stop bars ahead of an aircraft can be presented on either two-dimensional or three-dimensional (synthetic) displays such as an airport moving map. Thus, the caution about a possible overrun of the active stop bar can be depicted for the pilot on the Primary Flight Display. Further, the warning about an overrun of the active stop bar can be also depicted for pilot on the Primary Flight Display.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for displaying active stop bar information to an aircrew member of an aircraft, the system comprising:
   a display subsystem configured to display visual information to the aircrew member of the aircraft;
   a database comprising information regarding a geographical location of a stop bar at an airport;
   a position detecting subsystem that detects a current location of the aircraft with respect to a ground surface at the airport and to generate a first signal indicative of the current location of the aircraft;
   a light detection subsystem that (1) detects that a stop bar is lighted and active by detecting a light signature and pattern emitted from a lighted, active stop bar from an area surrounding the aircraft and that (2) generates a second signal indicative of the presence of the lighted, active stop bar; and
   a processor operatively coupled with the display subsystem, the position detecting subsystem, and the light detection subsystem,
   wherein the processor is configured to (1) receive the first signal from the position detecting subsystem, (2) based on the information in the database regarding the geographical location of the stop bar, determine whether the aircraft is within light detection range of the geographical location of the stop bar, (3) when in light detection range, estimate a location of the stop bar with respect to the aircraft based on the first signal and the geographical location of the stop bar, (4) receive the second signal from the light detection subsystem indicating that the stop bar is lighted and active, and (5) generate information regarding the position of the detected lighted, active stop bar, (6) command the display subsystem to display a graphic depiction of the detected lighted, active stop bar on the display subsystem, wherein the graphic depiction is indicative that the lighted, active stop bar is lighted and active,
   wherein the processor is further configured to determine a motional vector of the aircraft based on a defined fix time interval prediction, wherein the motional vector comprises an area inside which the aircraft is not able to stop, wherein the processor is further configured to generate a caution alert when the motional vector indicates that the aircraft will cross the detected lighted, active stop bar, and wherein the processor is still further configured to generate a warning alert when the aircraft position passes over the position of the detected lighted, active stop bar.

2. The system of claim 1, further comprising an electronic data storage unit configured to store a plurality of stop bar positions associated with a corresponding plurality of airport locations, and wherein the processor is further configured to retrieve a plurality of stop bar positions from the electronic data storage unit.

3. The system of claim 1, wherein the display subsystem comprises a moving map display subsystem configured to display a map that moves in a manner that corresponds with a movement of the aircraft.

4. The system of claim 1, wherein the light detection subsystem comprises an infrared camera.

5. The system of claim 1, wherein the processor is further configured to cause the system to generate an aural indication of the presence of the lighted, active stop bar.

6. The system of claim 1, wherein the light detection subsystem is configured to detect extended stop bar lights that are above ground level, and wherein the processor is configured to correct the information regarding the position of the detected lighted, active stop bar based on the extended stop bar lights.

7. The system of claim 1, wherein the light detection subsystem is configured to detect pavement stop bar lights.

8. A method for displaying active stop bar information to an aircrew member of an aircraft, the method comprising the steps of:
   detecting a position of the aircraft using GPS, wherein the detected position is within a light-emitting range of a stop bar at an airport;
   estimating a location of the stop bar with respect to the aircraft based on the detected position;
   capturing a light signature emitted from an area surrounding the aircraft, wherein the area surrounding the aircraft includes the estimated location of the stop bar, wherein capturing the light signature comprises capturing an infrared light signature with an infrared camera;
   using a processor of the aircraft, detecting that the stop bar is lighted and active by processing the captured light signature to detect a light pattern of a lighted, active stop bar, wherein the processing is performed on the basis of the estimated location of the stop bar;
   providing information to the aircrew member regarding the detection of the lighted, active stop bar, wherein the information regarding the detection of the lighted, active stop bar is indicative that the lighted, active stop bar is lighted and active;

determining a motional vector of the aircraft based on a defined fix time interval prediction, wherein the motional vector comprises an area inside which the aircraft is not able to stop;

generating a caution alert when the motional vector indicates that the aircraft will cross the detected lighted, active stop bar; and generating a warning alert when the aircraft position passes over the position of the detected lighted, active stop bar.

9. The method of claim 8, further comprising obtaining data from a database regarding a position and configuration of stop bars at an airport.

10. The method of claim 8, wherein providing information to the aircrew member comprises displaying the information on a map that moves in a manner that corresponds with a movement of the aircraft.

11. The method of claim 8, further comprising generating an aural indication of the presence of the lighted, active stop bar.

12. The method of claim 8, wherein detecting the light signature comprises detecting a light signature emitted by extended stop bar lights that are above ground level or by pavement stop bar lights.

13. A method for displaying active stop bar information to an aircrew member of an aircraft, the method comprising the steps of:

detecting a position of the aircraft using GPS, wherein the detected position is within a light-emitting range of a stop bar at an airport;

estimating a location of the stop bar with respect to the aircraft based on the detected position and based on an airport database;

capturing a light signature emitted from an area surrounding the aircraft, wherein the area surrounding the aircraft includes the estimated location of the stop bar, wherein capturing the light signature comprises capturing an infrared light signature with an infrared camera;

based on the estimated location and the positioning of the aircraft, determining a location within the captured light signature where the stop bar is expected to be;

using a processor of the aircraft, detecting that the stop bar is lighted and active by processing the captured light signature to detect a light pattern of a lighted, active stop bar based on where in the image the stop bar is expected to be, wherein the processing is performed on the basis of the estimated location of the stop bar; and providing information to the aircrew member regarding the detection of the lighted, active stop bar in the form of a visual or audio alert, wherein the information regarding the detection of the lighted, active stop bar is indicative that the lighted, active stop bar is lighted and active.

14. The method of claim 13, wherein the airport database includes data representing topography and features of an area surrounding the aircraft including at least taxiways, runways, holding areas, and landscape, wherein the database does not include exact position information regarding the position of any stop bars in the area surrounding the aircraft, and wherein the method includes executing an algorithm to search the captured light signature on the basis of expected locations of stop bars, wherein the method uses the data in the database and ICAO stop bar standards to determine the expected locations of stop bars.

15. The method of claim 14, determining a motional vector of the aircraft based on a defined fix time interval prediction, wherein the motional vector comprises an area inside which the aircraft is not able to stop;

generating a caution alert when the motional vector indicates that the aircraft will cross the detected lighted, active stop bar; and generating a warning alert when the aircraft position passes over the position of the detected lighted, active stop bar.

* * * * *